No. 894,273.

PATENTED JULY 28, 1908.

J. H. LENDI & A. H. SIMMONS.
WINDING MACHINE.
APPLICATION FILED JULY 26, 1907.

Witnesses:
Hazael C. Prado
David S. Kulfish

John H. Lendi,
Albert H. Simmons,
Inventors.

by McMeen & Miller
Attorneys.

No. 894,273. PATENTED JULY 28, 1908.
J. H. LENDI & A. H. SIMMONS.
WINDING MACHINE.
APPLICATION FILED JULY 26, 1907.

Witnesses:

John H. Lendi,
Albert H. Simmons,
Inventors.

by McMeen & Miller
Attorneys.

No. 894,273. PATENTED JULY 28, 1908.
J. H. LENDI & A. H. SIMMONS.
WINDING MACHINE.
APPLICATION FILED JULY 26, 1907.

Witnesses:

John H. Lendi,
Albert H. Simmons,
Inventors.

by McMunn Miller
Attorneys

UNITED STATES PATENT OFFICE.

JOHN H. LENDI AND ALBERT H. SIMMONS, OF CHICAGO, ILLINOIS, ASSIGNORS TO BELDEN MANUFACTURING COMPANY, OF CHICAGO, ILLINOIS, A CORPORATION OF ILLINOIS.

WINDING-MACHINE.

No. 894,273.　　　　Specification of Letters Patent.　　　Patented July 28, 1908.

Application filed July 26, 1907. Serial No. 385,752.

*To all whom it may concern:*

Be it known that we, JOHN H. LENDI and ALBERT H. SIMMONS, citizens of the United States of America, and residents of Chicago, county of Cook, and State of Illinois, have invented a new and useful Improvement in Winding-Machines, of which the following is a specification.

Our invention pertains to winding machines for electro-magnets and for the production of helixes of fiber, thread or wire.

Our object is to provide an automatic winding machine which will wind strand material, such as wire, upon a core, which will automatically dispose the strand material in layers as wound upon the core, and which will automatically insert sheet material into the helix while it is being wound.

Our invention provides a winding spindle, a reciprocating guide, and a pneumatic paper carrier, the parts being provided with proper direct and auxiliary details to secure their coöperation to the ends desired.

Our invention is illustrated in the accompanying drawings, in which.

Figure 1:
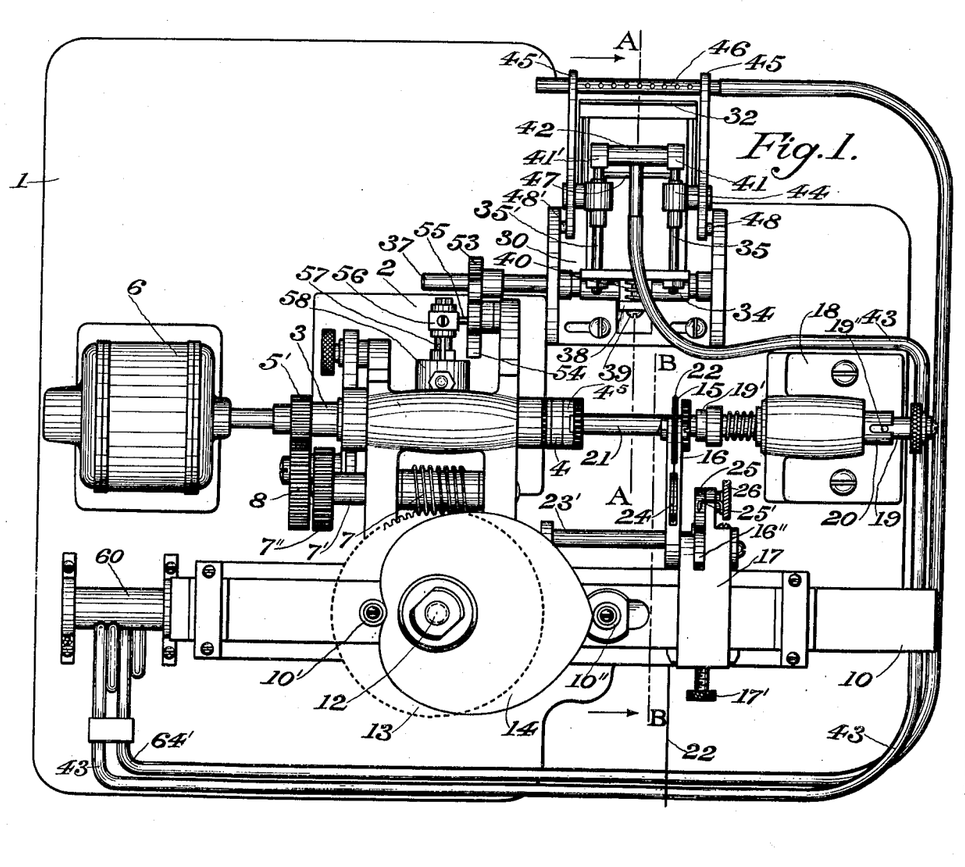
Figure 1 shows a plan of the complete device.

In Fig. 1, 1 is a base upon which the various parts of the complete machine of our invention are mounted. 2 is a casting mounted upon the base 1 and carrying the winding spindle 3, which is journaled in the casting 2 and carries at one end a spool-receiving device 4 and at the other end the pinion 5. (See Fig. 3.) The motor 6 is geared to the winding spindle 3, through the pinion $5'$ on the shaft of the motor 6 which meshes into pinion 5 on spindle 3.

Figure 8:
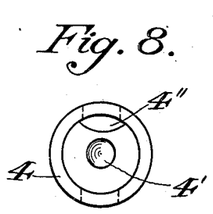
Fig. 8 shows an elevation of spool holding device.
Figure 9:
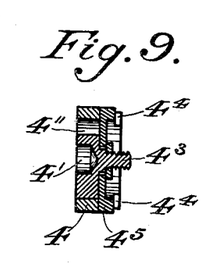
Fig. 9 shows a section thereof.

Detail of the spool-holding device 4 is shown in Figs. 8 and 9. It is bored at $4'$ to engage a center stud of the spindle 3. It is provided with a cavity at $4''$ to receive an eccentric pin upon the head of the spindle 3. It has threaded stud $4^3$ to receive and hold the core of the magnet spool and in its loose collar $4^5$ are cut two notches at $4^4$ to provide clearance for a pair of terminal clips. The object of this detail is to provide for holding and winding spools having a pair of terminal clips for the conductor mounted diametrically opposite each other upon one of the spool heads.

Worm 7 carried upon worm shaft $7'$ is driven by gear $7''$. Intermediate gear 8—$8'$ is a double cog wheel the larger of which engages pinion 5, and the smaller of which engages gear $7''$. By changing the intermediate gear 8—$8'$, any desired relation of the speed of spindle 3 to the speed of worm gear 7 may be obtained.

Frame 9 is mounted upon casting 2 and in the frame 9 the reciprocating bar 10 is adapted to slide. The cam shaft 12 is driven by the worm wheel 13 and carries the heart cam 14. The heart cam 14 engages two roller studs $10'$—$10''$ upon the reciprocating slide 10, and thereby effects the reciprocation of that slide in coöperation with the revolution of the winding spindle 3. The roller stud $10''$ is adjustable upon the slide 10, permitting the interchanging of heart cams to vary the extent of the reciprocating motion of the slide 10. The slide 10 is slotted as required to clear the cam shaft 12.

The guide wheel 15 is carried by the guide wheel arm 16 which is pivoted upon guide wheel block 17 which is locked to the reciprocating slide 10 by the screw $17'$. A tail piece 18 is provided, consisting of a casting carrying the spring pressed shaft 19, terminating in a cup at $19'$ which centers and holds one end of the spool upon which the wire or strand is to be wound. A pin $19''$ in the shaft 19 rests within the slot of a fixed sleeve 20, and the shaft 19 may be withheld in a retracted position by turning it so that the transverse pin $19''$ will engage the end of the fixed sleeve 20. A spool 21 is shown in the device in position for winding and a wire 22 is shown threaded over the guide wheel. In operation, the revolution of spindle 3, and consequent revolution of spool 21, will draw the wire 22 and wind it upon the core of the spool; at the same time the gears and worm will revolve the heart cam 14, thus moving the reciprocating slide 10 and causing the guide wheel to guide the wire into a uniform layer upon the core as the revolution of the core draws the wire forward. The ratio of cog wheels and the design of the heart cam shall be such that the rate of travel of slide 10 shall be approximately equal to the diameter of the wire 22 for each revolution of the spool 21, and the extent of travel of the slide 10 shall be approximately equal to the distance between spool heads, minus the thickness of the guide wheel 15. We have described thus far a complete winding device for disposing wire in layers upon a spool. An auxiliary idler guide wheel 23 is journaled loosely upon a fixed shaft 23′, and the further auxiliary idler guide wheel 24 is journaled in the guide wheel arm 16. The path of the wire 22 may be traced in Fig. 3, passing around guide wheels 23, 24 and 15 in the order mentioned.

Figure 6:
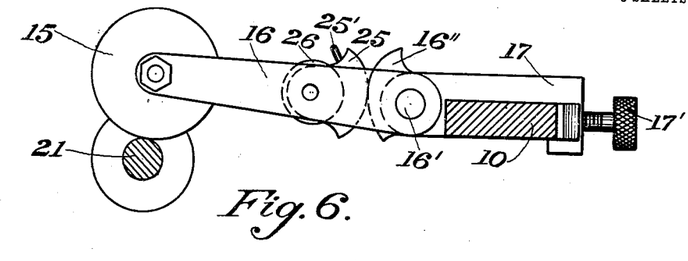
Fig. 6 illustrates the guide wheel mechanism and is a sectional view of a portion of the apparatus taken on line B—B of Fig. 1.

The detail of guide wheel 15 and guide wheel arm 16 is shown in Fig. 6. In this figure, which is taken on the line B—B Fig. 1, and looking in the direction of the arrow adjacent thereto, the slide bar 10 is shown in section and the guide wheel block 17 in elevation. The guide wheel arm 16 is mounted rigidly upon its pivot shaft 16′, and the cam 16″ also is mounted rigidly upon the shaft 16′; the guide wheel arm 16 and the cam 16″ thus being rigid with each other. The cam 25 with knurl 26 is mounted upon the guide wheel block 17 to coöperate with the cam 16″ as a lock upon the guide wheel arm 16. Cam 25 is pressed by spring 25′. When guide wheel arm 16 is elevated by the increasing thickness of wire under wheel 15 upon spool 21, the locking cam 25 moves into engagement with 16″ in its more elevated position and prevents the return of the arm 16. As guide wheel 15 is driven upward by any slight irregularity of the winding upon the spool 21, it will not return on account of the interference between the cams 16″ and 25. Hence in the average or normal running condition of the guide wheel 15, it is just out of continuous contact with the helix being wound; thus the layer of wire is prevented from injury by pressure of guide wheel 15, which is the object for which the cams 16″ and 25 are provided. In inserting a new empty spool, guide wheel 15 is allowed to drop upon the core by raising cam 25 by means of knurl 26.

It may be noted that the travel of the guide wheel 15 is less than the distance between spool heads by a distance equivalent to the thickness of the guide wheel 15, and that consequently the layer of wire probably will not cover the core throughout the entire distance between spool heads, although the design of the heart cam 14 may be such as to cause the guide wheel 15 to lag at each end of its travel and thereby furnish additional turns for filling the winding space completely.

If the winding space be not completely filled longitudinally by each layer, then the falling of turns of wire from their proper layers may be prevented by the introduction of sheet material, such as paper, between the layers, the edges of the sheet material at the ends of the layers thus providing means for holding the end turns in place.

Figure 4:
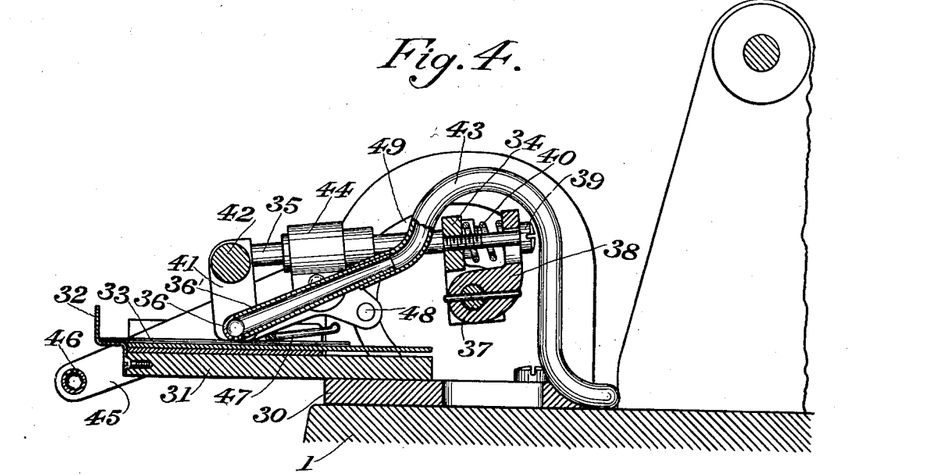
Fig. 4 shows a section of the pneumatic paper carrier of Fig. 1 on the line A—A, in the position shown in Fig. 1.
Figure 5:
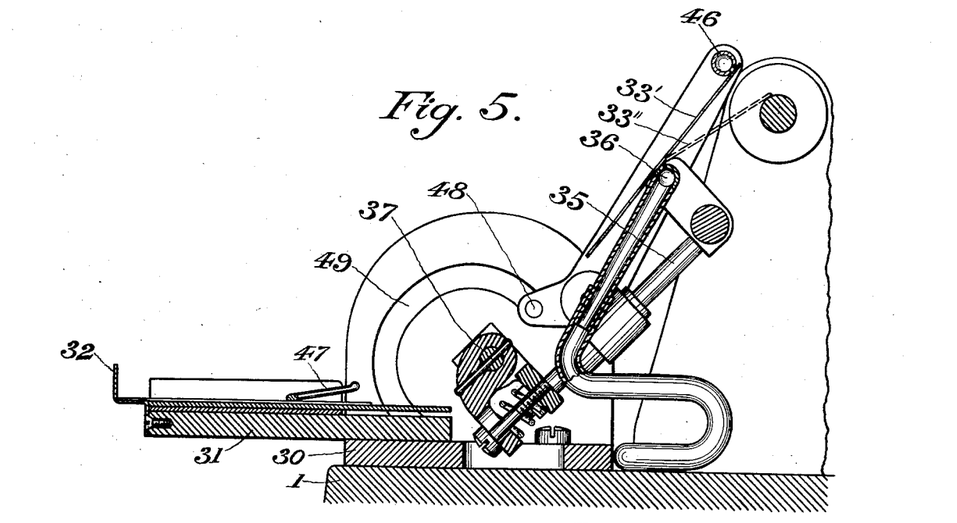
Fig. 5 shows a similar section with the apparatus in an alternative position.

We now pass to those portions of our complete winding machine which provide for the automatic insertion of sheet material into the coil as it is being wound. The paper inserting device consists mainly of an arrangement for lifting sheets of paper sheet by sheet from a feed table, carrying the sheet thus lifted to a position adjacent to the coil being wound, and, at the proper instant inserting the sheet into the coil without interrupting the process of winding. The device is shown in section in Figs. 4 and 5, in its alternative positions of picking up a sheet of paper and of feeding the paper into the coil being wound. Auxiliary to the device of Figs. 4 and 5 are three sources of power, controlled or provided by three cams upon the cam shaft 12. The first source of power may be recited as air suction or vacuum supply whereby the sheet of paper is lifted; the second source of power may be recited as an intermittent rotary motion whereby the paper thus taken charge of is lifted into feeding position in readiness to be fed into the coil being wound; the third source of power may be recited as air pressure, and its function is to blow the sheet of paper into the coil. Three cams upon the cam shaft 12 furnish or control the respective sources of power recited.

Referring first to Fig. 4, upon the base 1 is mounted the body casting 30, bearing the parts of the paper feeding device. The table 31, having the adjustable gage 32, holds the paper 33, of which two sheets are shown in position to be picked up by the suction arm. The carrier arm is built up of a cross casting 34, two parallel rods 35, 35′, terminating respectively in blocks 41, 41′, the blocks being connected for rigidity by the cross bar 42, and between the blocks 41, 41′ is supported the cross tube or picking tube 36, the parts being rigidly united, and the part 34 being sleeved loosely upon the shaft 37. Upon the shaft 37 is rigidly keyed the crank arm 38, perforated to clear the body of the screw 39 threaded into the casting 34, the screw 39 therefore being rigidly a part of the carrier arm of the device, and providing an adjustable connection between the carrier arm and the crank arm 38; the spiral compression spring 40 surrounds the body of the screw 39 and maintains a condition of tension between the parts 34 and 38, as shown. The object of this adjustable and yielding connection between the crank arm 38 and the carrier arm is to provide for the varying height of sheet material upon the table 31, the screw being adjusted to permit the carrier arm to hold the sheet in proper position for feeding, as shown in Fig. 5, the full travel of the crank arm being sufficient to permit the picking tube to rest upon the table when there is no paper upon the table, and the spring 40 yielding to permit the full travel of the crank arm 38 when the suction or picker arm is stopped by engagement with the table or is stopped short of its full travel by reason of a considerable thickness of sheet material upon the table 31, the pressure of the picking tube upon the sheet material at such time being only that due to the tension of the spring 40. The picking tube 36 is provided with a nozzle 36' for the attachment of the flexible air conductor 43.

The blower tube is installed upon an extension to the suction arm. The sleeves 44, 44' slide upon the rods 35, 35'. The pair of extension arms 45, 45' are rigidly attached to the sleeves 44, 44' respectively and are connected at their outer end rigidly by the tube 46 which is the blower tube of the paper feeding device. Each of the arms 45, 45' has an extension with a transverse stud 48, 48' respectively, the studs traveling within the eccentric slots 49, 49' respectively. The object accomplished is to extend the blower tube 46 beyond the guide 32 to permit the picking tube 36 to make contact with the pile of paper on the feed table, when the device is in the position shown in Fig. 4, and to retract the blower tube 46 to a position behind the end of the sheet of paper 33' held by the picking tube when the device is in the position shown in Fig. 5. The picking tube 36 is perforated with a row of holes along that tangent line which rests in contact with the paper when the device is in the position shown in Fig. 4. The blower tube 46 is provided with a row of holes approximately on the radial line passing toward the axis of the spool being wound when the paper feeding device is in the position shown in Fig. 5. The member 47 is pivoted loosely at its ends and rests in its central portion upon the top of the supply of paper, acting as a paper weight to hold the sheets in place, and acting also as a dragging weight, flexing the sheet of paper picked up by the picking tube 36 to insure the separation of the top sheet from the next underlying sheet.

Before studying the means for controlling the divers sources of power as required by the device of Fig. 4, the operation of the device may be understood by a study of Figs. 4 and 5. The device in the position shown in Fig. 4 may be considered in its normal position of rest. Tube 43 by proper control means is now connected to a vacuum, and picking tube 36 is exhausted, the top sheet of the supply of paper being then held against the picking tube 36 by external air pressure. By proper control, shaft 37 now is revolved to bring the device into the position shown in Fig. 5, the sheet of paper being carried into its second position 33' by the vacuum picking tube 36, and the blower tube 46 passing into position behind the leading edge of the sheet of paper. Immediately preceding the instant at which the paper should start into the coil being wound, air pressure is placed upon the blower tube 46 and air jets from the row of holes in that tube blow the leading edge of the sheet of paper into contact with the revolving core or coil being wound, as shown dotted at 33''; the paper still being held by the outward air pressure upon it at its contact with the suction tube 36. At the exact instant when the leading edge of the sheet of paper should enter the coil being wound, proper control means breaks down the vacuum of the tube 36, thus releasing the paper, and the paper is drawn around the coil being wound by reason of the friction of its leading edge, the entire sheet of paper being held closely to the core or coil by pressure of the air brush from the blower tube 46. The conductor or strand 22 being wound holds the paper after the first turn, and the air pressure then may be cut off from the tube 46 and the shaft 37 is revolved in reverse direction to return the entire apparatus to the position shown in Fig. 4.

Figure 2:
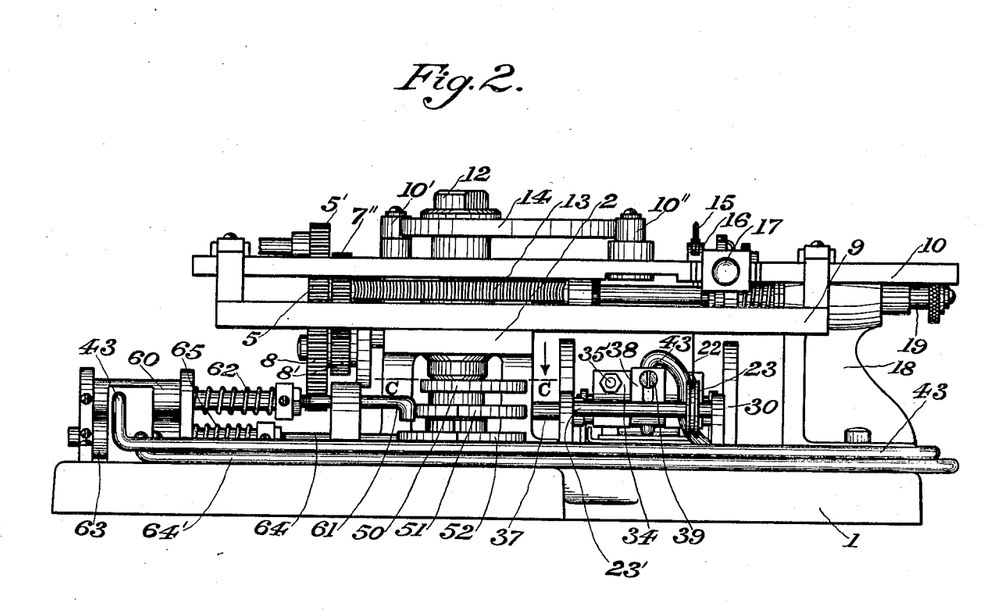
Fig. 2 shows an elevation.
Figure 3:
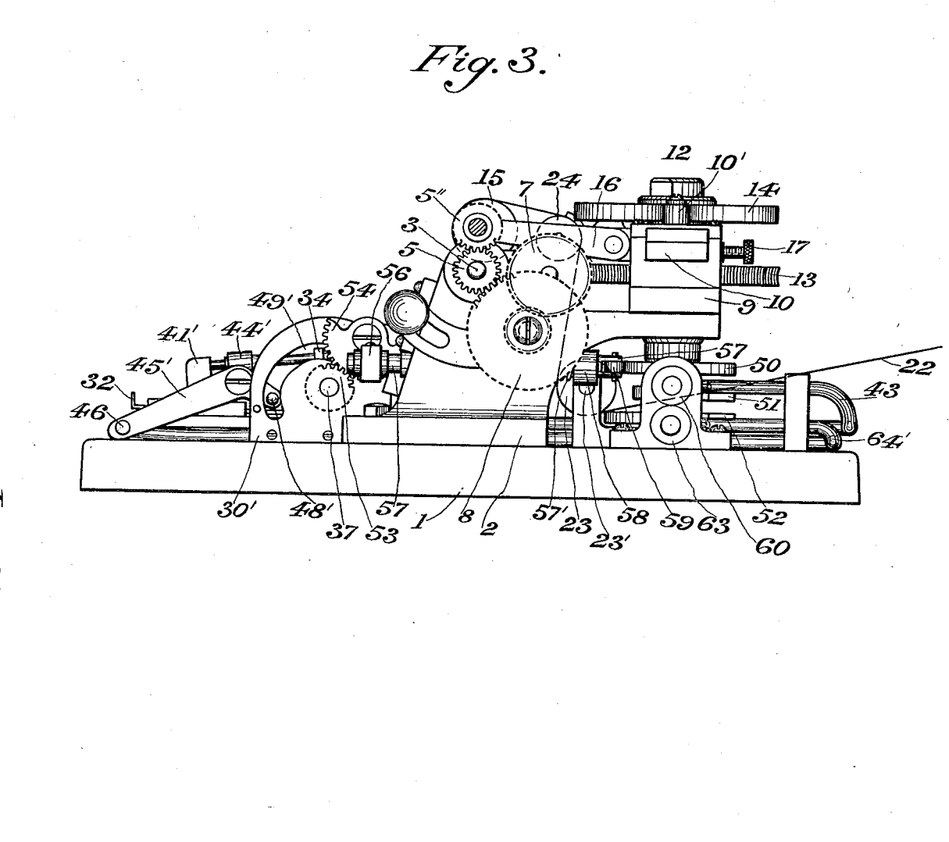
Fig. 3 shows an end elevation with the motor 6 of Fig. 1 removed.
Figure 7:
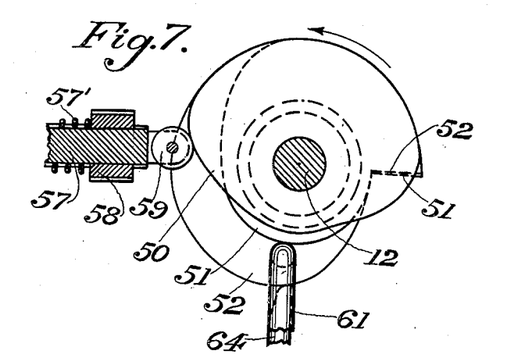
Fig. 7 illustrates details of controlling cams and is a sectional view of a portion of the apparatus taken on the line C—C of Fig. 2.

We now shall pass to the controlling device whereby the described operation of the paper feeding device is secured. Referring to Fig. 2, the cam shaft 12 bears the three cams 50, 51, 52. These are also shown in Fig. 7. Referring to Figs. 1 and 3, the shaft 37 carries the pinion 53 which is meshed by the arc 54 which carries a wrist pin 55, traveling in a vertical slot in the cross block 56 of the plunger rod 57. The plunger rod 57 is slidably mounted within the bushing 58 and a compression spring 57', surrounding the rod 57 and pressing against the collar 58, forces the plunger rod 57 against the cam 50, a roller 59 being provided at the point of contact. When the cam 50 forces the plunger rod 57 away from the cam shaft 12, the arc 54 is rotated clock-wise, as viewed in Fig. 3, and the pinion 53 and shaft 37 are rotated counterclock-wise, as viewed in Figs. 3, 4, 5, and the paper feeding devices assumes the position shown in Fig. 4. Conversely, when the cam 50 permits the plunger rod 57 to approach the cam shaft 12, the spring 57' operates to move the plunger rod, and thus through the arc and pinion operates to cause the paper feeding device to assume the position shown in Fig. 5.

The cam 51 controls the connection between the picking tube 36 and a vacuum reservoir by operating the valve 60. The valve 60 is operated by the plunger 61 which is pressed against the cam 51 by the coiled spring 62. When the plunger 61 is pressed away from the cam shaft 12, the valve 60 is operated to connect the flexible tube 43 and picking tube 36 to the vacuum supply; when the plunger 61 is permitted to approach the cam shaft 12, the flexible tube 43 and picking tube 36 are connected through the valve 60 to the open air, thus breaking down any vacuum previously established in the picking tube 36. The cam 52 controls the connection between the blower tube 46 and the compressed air tank by operating the valve 63. The valve 63 is operated by the plunger 64 which is pressed against the cam 52 by the coiled spring 65. When the plunger 64 is pressed away from the cam shaft 12, the valve 63 is operated to disconnect the flexible tube 64' and blower tube 46 from the air pressure tank; when the plunger 64 is permitted to approach the cam shaft 12, the flexible tube 64' and blower tube 46 are connected through the valve 63 to the compressed air supply. The three cams 50, 51, 52 are adjustable upon the shaft 12 and are adjusted to bring about the proper timing of the various operations controlled in the paper feeding device to effect the result desired.

We do not wish to limit our invention in all respects to the exact details herein shown and described, as we understand that many modifications may be made without departing from the spirit or scope of our invention.

What we claim as new and desire to secure by United States Letters Patent is:

1. In a helix-winding device, a spool holder having notches in the face thereof to provide clearance for terminal clips mounted upon the head of the spool being wound, substantially as described.

2. In a helix-winding device, a pivoted guide-wheel arm, a guide wheel on said arm, and means for preventing the falling of said guide wheel toward the helix being wound subsequent to any lifting of said guide wheel from the helix being wound, substantially as described.

3. In a helix-winding device, a pivoted guide wheel arm, a guide wheel on said arm, and automatic means for preventing the movement of said guide wheel toward the helix being wound, substantially as described.

4. In a helix-winding device, a pivoted guide-wheel arm, a guide wheel on said arm, a cam associated with said guide-wheel arm, and a second cam spring-pressed to engage and lock said first cam against movement in one direction, substantially as described.

5. In a helix-winding device, a pivoted guide-wheel arm, a guide wheel on said arm, a cam associated with said guide-wheel arm, and a second cam spring-pressed to engage and lock said first cam against movement in one direction, and means for manually withdrawing said second cam from said first cam, substantially as described.

6. In a helix-winding device, a pivoted carrier arm for handling sheet material, a crank arm for propelling said carrier arm, said two parts being adapted to move about the same axis, and a yielding connection between said carrier arm and said crank arm, substantially as described.

7. In a helix-winding device, a pivoted carrier arm for handling sheet material, a crank arm for propelling said carrier arm, said two parts being adapted to move about the same axis, and a yielding connection between said carrier arm and said crank arm, layer forming means for forming the helix in layers, and means associated with said layer forming means for operating said carrier arm, substantially as described.

8. In a helix-winding device, a pivoted carrier arm for handling sheet material, a crank arm for propelling said carrier arm, and a yielding connection between said carrier arm and said crank arm, a winding spindle, and a cam for controlling the movement of said crank arm, said cam being geared from said winding spindle, substantially as described.

9. In a helix-winding device, a pivoted carrier arm for handling sheet material, means for propelling said carrier arm into contact with the top sheet of a supply of sheet material, and a spring connecting said carrier arm and said propelling means and forming a yielding connection therebetween for modifying the travel of said carrier arm as required by the variable position of the sheet to be picked up and carried, substantially as described.

10. In a helix-winding device, a carrier arm for sheet material, a blower on said carrier arm, and means for moving said blower with respect to sheet material carried by said carrier arm, substantially as described.

11. In a helix-winding device, a carrier arm for sheet material, a mounting frame supporting said carrier arm, a blower slidably mounted on said carrier arm, and means associated with said blower and said frame for moving said blower with respect to said carrier arm when said carrier arm is moved with respect to said frame, substantially as described.

12. In a helix-winding device, a carrier arm for sheet material, a mounting frame supporting said carrier arm, a blower slidably mounted on said carrier arm, studs associated rigidly with said blower and moving in slots in said frame whereby the sliding of said blower upon said carrier arm is controlled, substantially as described.

13. In a helix-winding device, a carrier arm for sheet material, a vacuum sheet holder on said carrier arm, a blower on said carrier arm, and means for breaking down the vacuum in said sheet holder subsequent to applying an air brush from said blower to the sheet material carried by said carrier arm, substantially as described.

14. In a helix-winding device, a carrier arm for sheet material, a sheet holder on said carrier arm, a blower on said carrier arm, and means for releasing said sheet holder subsequent to applying an air brush from said blower to the sheet material carried by said carrier arm, substantially as described.

15. In a helix-winding device, a carrier arm for sheet material, a vacuum sheet holder on said carrier arm, a blower on said carrier arm, and means for breaking down the vacuum in said sheet holder subsequent to applying an air brush from said blower to the sheet material carried by said arm, a layer-forming guide wheel for forming the helix being wound into layers, a cam controlling the vacuum of said sheet holder, a cam controlling the air pressure of said blower, a cam controlling the lateral movement of said layer-forming guide wheel, and a common cam shaft for all of said cams, substantially as described.

16. In a helix-winding device, a carrier arm for sheet material, a sheet holder on said carrier arm, a blower on said carrier arm, and means for releasing said sheet holder subsequent to applying an air brush from said blower to the sheet material carried by said carrier arm, a layer-forming guide wheel for forming the helix being wound into layers, a cam controlling said sheet holder, a cam controlling the air pressure of said blower, a cam controlling the lateral movement of said layer - forming guide wheel, and a common cam shaft for all of said cams, substantially as described.

17. In a helix-winding device, a carrier arm adapted to hold a piece of sheet material adjacent to a helix being wound, a vacuum sheet holder on said carrier arm, a blower on said carrier arm and adapted to blow against the helix being wound the leading edge of a sheet of material held by said vacuum sheet holder, and means for causing said vacuum sheet holder to release the sheet material, substantially as described.

18. In a helix-winding device, a carrier arm adapted to hold a piece of sheet material adjacent to a helix being wound, a vacuum sheet holder on said carrier arm, a blower adapted to blow against the helix being wound the leading edge of a sheet of material held by said vacuum sheet holder, and means for causing said vacuum sheet holder to release the sheet material, substantially as described.

19. In a helix-winding device, a carrier arm adapted to hold a piece of sheet material adjacent to a helix being wound, and an air blower on said carrier arm and adapted to blow against a helix being wound the leading edge of a sheet of material held by said arm, substantially as described.

20. In a helix-winding device, a carrier arm adapted to hold a piece of sheet material adjacent to a helix being wound, and an air blower adapted to blow against a helix being wound the leading edge of a sheet of material held by said arm, substantially as described.

21. In a helix-winding device, a carrier for handling sheet material, a crank arm for propelling said carrier, and a yielding connection between said carrier and said crank arm, layer forming means for forming the helix in layers, and means associated with said layer forming means for operating said carrier, substantially as described.

22. In a helix-winding device, a carrier for handling sheet material, a crank arm for propelling said carrier, and a yielding connection between said carrier arm and said crank arm, a winding spindle, and a cam for controlling the movement of said crank arm, said cam being geared from said winding spindle, substantially as described.

23. In a helix-winding device, a carrier for handling sheet material, a cam for controlling said carrier, a layer-forming guide wheel, a cam for controlling said layer-forming guide wheel, and a common cam shaft for said cams, substantially as described.

24. In a helix-winding device, a carrier for sheet material, a mounting frame supporting said carrier, a blower slidably mounted on said carrier, and means associated with said blower and said frame for moving said blower with respect to said carrier when said carrier is moved with respect to said frame, substantially as described.

25. In a helix-winding device, a carrier for sheet material, a sheet holder on said carrier, a blower on said carrier, and means for releasing said sheet holder subsequent to applying an air brush from said blower to the sheet material carried by said carrier, substantially as described.

26. In a helix-winding device, a carrier for sheet material, a sheet holder on said carrier, a blower on said carrier, and means for releasing said sheet holder subsequent to applying an air brush from said blower to the sheet material carried by said carrier, a layer-forming guide wheel for forming the helix being wound into layers, a cam controlling said sheet holder, a cam controlling the air pressure of said blower, a cam controlling the lateral movement of said layer - forming guide wheel, and a common cam shaft for all of said cams, substantially as described.

27. In a helix-winding device, a carrier adapted to hold a piece of sheet material adjacent to a helix being wound, a vacuum sheet holder on said carrier, a blower adapted to blow against the helix being wound the leading edge of a sheet of material held by said vacuum sheet holder, and means for causing said vacuum sheet holder to release the sheet material, substantially as described.

28. In a helix-winding device, a carrier adapted to hold a piece of sheet material adjacent to a helix being wound, and an air blower on said carrier and adapted to blow against a helix being wound the leading edge of a sheet of material held by said carrier, substantially as described.

29. In a helix-winding device, a carrier adapted to hold a piece of sheet material adjacent to a helix being wound, and an air blower adapted to blow against a helix being wound the leading edge of a sheet of material held by said carrier, substantially as described.

30. In a helix-winding device, a carrier adapted to hold a piece of sheet material adjacent to a helix being wound, a cam for controlling said carrier, an air blower adapted to blow against a helix being wound the leading edge of a sheet of material held by said carrier, a cam for controlling the admission of compressed air to said air blower, holding means for said sheet material on said carrier, a cam for controlling said holding means, and a common cam shaft for all of said cams, substantially as described.

31. In a helix-winding device, a carrier adapted to hold a piece of sheet material adjacent to a helix being wound, a cam for controlling said carrier, an air blower adapted to blow against a helix being wound the leading edge of a sheet of material held by said carrier, a cam for controlling the admission of compressed air to said air blower, holding means for said sheet material on said carrier, a cam for controlling said holding means, guiding means for disposing in layers the strand or wire being wound into the helix, a cam for controlling said guiding means, and a common cam shaft for all of said cams, substantially as described.

Signed by us at Chicago, county of Cook and State of Illinois, in the presence of two witnesses.

JOHN H. LENDI.
ALBERT H. SIMMONS.

Witnesses:
M. A. PETTIT,
J. W. CLEVELAND.